(12) United States Patent
Benz et al.

(10) Patent No.: US 6,599,959 B2
(45) Date of Patent: *Jul. 29, 2003

(54) CONTACT LENS OF HIGH WATER CONTENT AND HIGH WATER BALANCE

(75) Inventors: Patrick H. Benz, Sarasota, FL (US); Jose A. Ors, Sarasota, FL (US)

(73) Assignee: Benz Research and Development Corporation, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/871,737

(22) Filed: Jun. 4, 2001

(65) Prior Publication Data

US 2002/0019455 A1 Feb. 14, 2002

Related U.S. Application Data

(60) Continuation of application No. 09/523,981, filed on Mar. 13, 2000, now Pat. No. 6,242,508, which is a division of application No. 09/073,939, filed on May 7, 1998, now Pat. No. 6,096,799.

(51) Int. Cl.$^7$ .............................. G02C 7/04; G02C 7/01; C08L 33/14; C08J 5/18
(52) U.S. Cl. ...................... 523/106; 523/108; 526/320; 351/160 H; 351/177
(58) Field of Search ................................ 523/106, 108; 526/320; 351/106 H, 177

(56) References Cited

U.S. PATENT DOCUMENTS

| | | |
|---|---|---|
| 3,752,788 A | 8/1973 | Hirooka et al. |
| 4,174,543 A | 11/1979 | Kelman |
| 4,379,864 A | 4/1983 | Gallop et al. |
| 4,388,448 A | 6/1983 | Melby |
| 4,582,884 A | 4/1986 | Ratkowski |
| 4,718,906 A | 1/1988 | Mackool |
| 4,764,169 A | 8/1988 | Grendahl |
| 4,769,431 A | 9/1988 | Ratkowski |
| 4,866,148 A | 9/1989 | Geyer et al. |
| 4,997,442 A | 3/1991 | Barrett |
| 5,147,902 A | 9/1992 | Ichikawa et al. |
| 5,217,491 A | 6/1993 | Vanderbilt |
| 5,326,506 A | 7/1994 | Vanderbilt |
| 5,330,911 A | 7/1994 | Hubbell et al. |
| 5,480,950 A | 1/1996 | Wang et al. |
| 5,507,805 A | 4/1996 | Koeniger |
| 5,532,289 A | 7/1996 | Benz et al. |
| 5,972,251 A | * 10/1999 | Shannon ..................... 264/1.7 |
| 6,242,508 B1 | * 6/2001 | Benz et al. ................. 523/106 |

FOREIGN PATENT DOCUMENTS

| | | |
|---|---|---|
| EP | 0 485 197 | 5/1992 |
| GB | 2196973 A | 5/1988 |
| WO | WO 90 09230 | 8/1990 |

OTHER PUBLICATIONS

Refojo, "Glyceryl Methacrylate Hydrogels" *Journal of App. Pol Sci.* 9:3161–3170 (1965).
Macret et al., "Hydroxyalkyl methacrylates: hydrogel formation based on the radical coplymerization of 2–hydroxyethyl–methacrylate and 2, 3–dihydroxypropyl–methacrylate" *Polymer* 23:748–753 (1982).
Yasuda et al., "Hydrogels of Poly (hydroxyethyl Methacrylate) and Hydroxyethyl Methacrylate–Glycerol Monomethacrylate Copolymers" *Journal of Pol. Sci. Part A–1* 4:2913–2927 (1966).
Macret et al., "Hydroxyalkyl methacrylates: Kinetic investigation of radical polymerizations of pure 20hydroxyethyl methacrylasteand 2, 3–dihydroxypropyl methacrylate and the radical copolymerization of their mixtures" *Polymer* 23:81–90 (1982).
Businger, die Kontakinsen 7–8, 4 (1997).
Clinical studies by Businger in Contact Lens Spectru, Aug. 1995, pp. 19–25.
Pescossolido et al., Contactologia, 15D, 64–7 (1993).
Benz et al., Contact Lens Spectrum Jul. 1997, pp. 40–46.
Ors et al., Proceedings of ACS Division of PMSE 56,744 (1987).
Kloosterboer et al., Phillips Tech. Rev. 40,928 (1982).
Benz Technical Manual, Sep. 1992.
Benz Technical Manual, Apr. 1993.
J Cataract Refract Surg—vol. 17, Mar. 1991. "Cytotoxic effects of residual chemicals from polymeric biomaterials for artificial soft intraocular lenses".

* cited by examiner

Primary Examiner—Tae H. Yoon
(74) Attorney, Agent, or Firm—Foley & Lardner (57) ABSTRACT

A contact lens of high water content and extremely high water balance made of a homopolymer or copolymer of 2,3-dihydroxypropyl methacrylate and methods of making such contact lenses, and polymers and hydrogels useful in such contact lenses.

24 Claims, 3 Drawing Sheets

CONTACT LENS OF HIGH WATER CONTENT AND HIGH WATER BALANCE

CROSS-REFERENCES TO RELATED APPLICATIONS

This application is a continuation application of U.S. Ser. No. 09/523,981 filed Mar. 13, 2000, now U.S. Pat. No. 6,242,508, which is a divisional of U.S. Ser. No. 09/073,939 filed May 7, 1998, now issued as U.S. Pat. No. 6,096,799.

BACKGROUND OF THE INVENTION

1. Field of the Invention

The present invention relates to a contact lens formed from a polymer based on 2,3-dihydroxypropyl methacrylate (GMA) that has high water content and high water balance. The present invention also relates to methods of making and using such contact lenses. The present invention also relates to polymers and hydrogels of GMA and to methods of making and using such polymers.

2. Description of the Related Art

The literature teaches that high water content lenses are susceptible to dimensional changes during wear because they tend to lose a higher percent of water (dehydrate) relative to lenses of lower water content. Further, the ability to regain the lost water (rehydrate) is important to the dimensional stability of a contact lens. If a lens material absorbs water more rapidly, then the lens will more closely return to a water-saturated state during each blink, when the lens is bathed in tear fluid. Therefore, as a lens begins to dehydrate, a characteristic of rapid rehydration is extremely advantageous for maintaining saturation and maximum stability.

Unfortunately, conventional contact lens development either has ignored the effect of rehydration rate upon lenses or has constructed lenses of materials with a less than optimal rate of rehydration.

U.S. Pat. No. 5,532,289, hereby incorporated by reference in its entirety, describes a family of copolymers useful for making contact lenses. The copolymers have improved ability to remain near their water saturated state during wear. In this patent, the inventors of the present invention describe a method for making contact lenses with improved dimensional stability based on copolymers of 2,3-dihydroxypropyl methacrylate (GMA) and 2-hydroxy ethyl methacrylate (HE-MAN). The polymers contain between 20 and 90 mole percent of GMA and have a water content from about 40 to about 70% by weight. The dimensional stability of these lenses results from the ability of these hydrogels to strongly bind water.

In the '289 patent, lenses made from this family of materials were shown, under in-vitro conditions, to be slow to dehydrate and fast to rehydrate, relative to all other soft lens materials. The times it took a lens to is dehydrate to 10% of its water weight and rehydrate back to saturation were combined into a factor called "water balance". This "water balance" value can be used to compare commercial lens materials, regardless of water content and as a guideline, by practitioners, in selecting an appropriate lens material for a patient. This patent also emphasizes the ability to remain near or at saturation as a key to dimensional stability in a soft lens.

Clinical studies by Businger in Contact Lens Spectrum, August 1995, pp. 19–25 and die Kontaklinsen 7–8, 4 (1997) support the laboratory findings on water retention and lens stability. These studies report that lenses made from hioxifilcon A (p-GMA/HE-MAN, 59% water) were preferred by the largest margin of test subjects because of comfort and visual acuity. These lenses showed the highest dimensional stability and the best of both low-contrast and high-contrast visual acuity during wear cycles of 14 hours, over a period of 30 days, over other conventional contact lenses irrespective of water content.

The literature teaches that the water content of GMA/HEMA copolymers increases, from an initial 38% for p-HEMA, with increasing concentration of GMA. See, Yasuda, et. al., Journal of Polymer Science: Part A1, 4, 2913–27 (1966) and Macret et. al., Polymer, 23(5) 748–753 (1982), which describes hydrogels based on HEMA and GMA.

Refojo, Journal of Applied Polymer Science, 9, 3161–70 (1965), describes hydrogels of high water content made from GMA. The polymer are made by polymerization in bulk or in water solution. Also, high water content hydrogels of copolymers of GMA and glycidyl methacrylate are described.

Wichterle, et. al., UK Patent GB 2196973A, reported the use of hydrophilic solvents, such as glycerol, dimethylformamide, and dimethylsulfoxide, in 2-HEMA blends primarily for the centrifugal casting of contact lenses.

SUMMARY OF THE INVENTION

The literature is significantly void of examples of p-GMA homopolymer and copolymers where the GMA content exceeds 80 mole percent, for use in contact lens application. While some of the literature described above discusses hydrogels based on GMA polymers, the literature fails to suggests to fabricate contact lenses from polymer of high GMA content; and certainly none of the literature suggests that contact lenses formed from polymers of at least 80 mole percent GMA could exhibit the outstanding and unexpected properties, including slow dehydration and fast rehydration, i.e., a high water balance, discovered by the present inventors.

Since polymers that contain 2,3-dihydroxypropyl methacrylate (GMA) show improved water retention capability (See Pescossolido et al., Contactologia, 15D, 64–7 (1993) and Benz et al., Contact Lens Spectrum July 1997, pp. 40–46), the present inventors conceived that a polymer composed mostly of GMA should yield a contact lens with extraordinary dimensional stability and water retention. Overall lens performance, with respect to stability and water retention, should surpass any commercial available lens material. However, to date, the art has failed to suggest contact lenses formed of polymers having at least 80 mol percent GMA or method of making such lenses.

Accordingly, it is an object of the present invention to provide contact lenses formed from a material primarily composed of GMA.

It is also an object of the invention to provide methods of making and using such contact lenses.

Another object of the invention is to provide polymers with improved machining, useful for a spheric contact lens, a toric contact lens, a multifocal contact lens, and a bandage contact lens.

Another object of the invention is to provide a spheric contact lens, a toric contact lens, a multifocal contact lens, and a bandage contact lens with superior dimensional stability.

Another object of the invention is to provide a spheric contact lens, a toric contact lens, a multifocal contact lens and a bandage contact lens with superior water retention and water balance.

Another object of the invention is to provide a spheric contact lens, a toric contact lens, a multifocal contact lens and a bandage contact lens suitable for daily wear and extended wear modalities.

It is also an object of the invention to provide blanks for contact lenses, and finished and unfinished contact lenses having improved characteristics, such as high water content and high water balance.

In accordance with these and other objectives, there has been provided according to the present invention, a contact lens formed of a copolymer of more than 80 mole percent, generally more than 90 mol percent, of 2,3-dihydroxypropyl methacrylate and up to 20 mol percent, generally from 0.05 up to 10 mol percent of a reactive pyrrolidone, such as a N-alkenyl pyrrolidone, such as N-vinyl pyrrolidone, or alkoxy alkyl methacrylate of formula wherein $R_1$ and $R_2$ are independently alkyl groups of 1 to 6 carbon atoms, and MA is methacrylate.

There also has been provided in accordance with the present invention, a hydrogel of a polymer including more than 90 mole percent of units from 2,3-dihydroxypropyl methacrylate and up to 10 mol percent of N-vinyl pyrrolidone or alkoxy alkyl methacrylate of formula wherein $R_1$ and $R_2$ are independently alkyl groups of 1 to 6 carbon atoms and MA is methacrylate, wherein the polymer has a water content of at least 60% by weight of the polymer.

There is also provided a contact lens formed from a homopolymer of 2,3-dihydroxypropyl methacrylate, wherein the polymer has a water content of at least 60%, and a water balance of greater than about 8 relative to that of p-HEMA.

There is also provided in accordance with the present invention a method of making a polymer including more than 90 mol percent of units from 2,3-dihydroxypropyl methacrylate, comprising polymerizing 2,3-dihydroxypropyl methacrylate in the presence of a polar aprotic diluent.

There is also provided a method of making a contact lens, comprising polymerizing GMA and a comonomer in the presence of a polar aprotic diluent to form a copolymer, and forming the copolymer into a contact lens.

Further objects, features, and advantages of the present invention will become apparent from the detailed description of preferred embodiments that follows.

DETAILED DESCRIPTION OF PREFERRED EMBODIMENTS

The present invention provides a family of non-ionic, high water content materials with excellent dimensional stability, high water balance, and improved lathing (machinability), useful in making contact lenses. The material is a homopolymer or copolymer (containing 2 or more types of monomers) having more than 80 mole percent, preferably more than 90 mol percent of GMA. The homopolymer include about 100 mol percent of the GMA. Useful comonomers polymerizable with the GMA include any comonomers that can be polymerized with GMA.

The homopolymers and copolymers of the invention generally have a water content of at least about 60 percent, such as greater than about 65%, or greater than about 70% by weight. They also have a water balance relative to that of p-HEMA of greater than about 8, generally greater than 9, and even greater than 10. Water balance is described in U.S. Pat. No. 5,532,289 and application Ser. No. 08/674,275 filed Jul. 1, 1996, both hereby incorporated by reference in their entireties.

The polymers of the present invention can be formed into hydrogels, contact lens blanks, semi-finished contact lenses, or finished contact lenses. The contact lenses can be of any type including spheric, toric, multifocal, and bandage contact lenses.

The present inventors have found that alkoxyalkylmethacrylates of formula wherein $R_1$ and $R_2$ are independently alkyl groups of 1 to 6 carbon atoms, and MA is methacrylate; and reactive pyrrolidones, such as N-vinyl pyrrolidone are especially useful comonomers.

The polymers of GMA can be prepared using polymerization techniques well known to those in the art. Any desired crosslinking agents or initiators can be used in result-effective amounts. Useful crosslinking agents include ethylene glycol dimethacrylate. Crosslinkers are generally used in amounts of less than 5 weight percent, generally less than 2 weight percent, based on the weight of the polymer. Useful initiators include the azo initiators such as used in the examples. Polymerization can takes place at any temperature, but preferably above room temperature, for example, above 30° C. or above about 40° C.

Due to the fact that concentrated GMA solutions are highly viscous, the present inventors have also developed a procedure for preparing polymers having a high content of GMA. As with glycerol, GMA's high viscosity results in part because of the vicinal —OH groups leading to a tight (hydrogen-bond) network, which greatly influence polymerization because molecular motion is greatly restricted.

Figure 1:
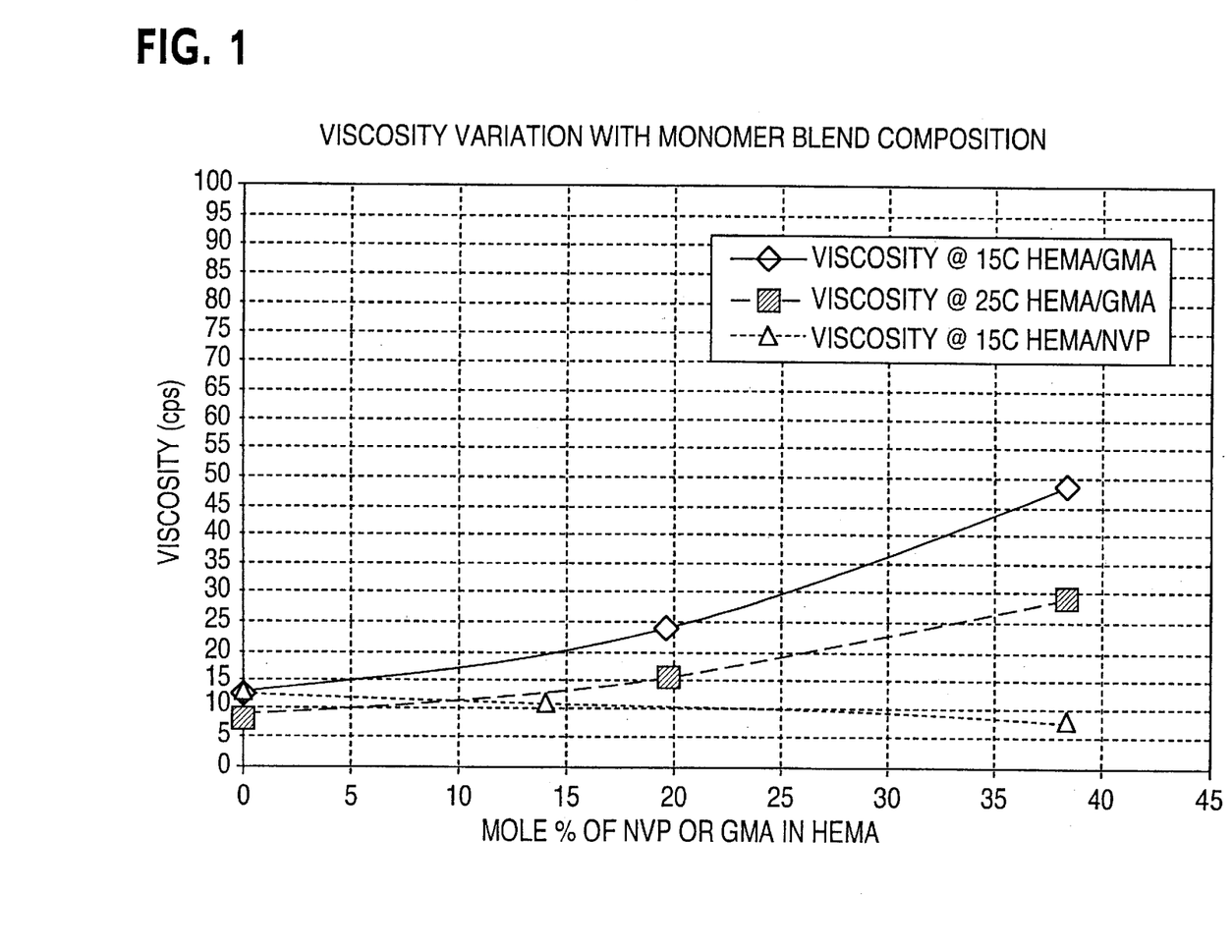
FIG. 1 shows the viscosity variation for blends of 2-HEMA with GMA and NVP.

The effect of GMA on viscosity can be seen in FIG. 1. FIG. 1 shows the contrasting effect on the viscosity of 2-HEMA when blended with monomers like GMA and NVP. Addition of GMA increases the viscosity of the HEMA blend, while NVP has the opposite effect. NVP reduces the viscosity of HEMA blends, in part, because it contains no hydroxyl groups (i.e., is aprotic) and disrupts the internal H-bond network since the lactam nitrogen is a weaker hydrogen-bonding moiety. When GMA is polymerized in the presence of NVP, the disruption of the intermolecular H-bond network of the GMA, reduces viscosity and improves the polymerization conditions and consistency. During the initial phase of the polymerization with GMA, the NVP comonomer acts as a reactive diluent improving the mobility of the di-hydroxy containing comonomer and allowing a higher level of polymerization prior to gel.

Thus, the present invention relates to method of preparing GMA polymers by polymerizing in the presence of a reactive polar aprotic diluent, such as N-vinyl pyrrolidone and/or a non-reactive polar aprotic diluent. Protic diluents can be used in combination with the aprotic diluents. Generally, at least 50% by weight of the total diluent should be an aprotic polar diluent, which is reactive or unreactive.

As discussed above, the present invention relates to GMA homopolymers and copolymers, useful in contact lenses. The homopolymers and copolymers are discussed below.

GMA Homopolymer

To obtain a GMA homopolymer, the GMA is combined with one or more non-reactive polar aprotic diluents or blend of such diluents with a protic diluent and polymerized. Non-reactive diluents are ones that do not copolymerize with the GMA, thus ensuring that a homopolymer of GMA is formed. The non-reactive polar diluent(s) act to disrupt the intra-intermolecular H-bond network of the GMA monomer and to reduce the viscosity of the blend, thereby increasing reactant mobility and allowing a more desirable and random polymerization. Diluent selection is important because it should be inert, should improve the polymerization process, and should be effectively removed during hydration.

Two fundamental types of diluent that can be used in polymerizations are protic and aprotic diluents. An aprotic diluent is used in the methods of the present invention. Polar aprotic diluents alone or in combination with protic diluents, such as water can be used.

Figure 2:
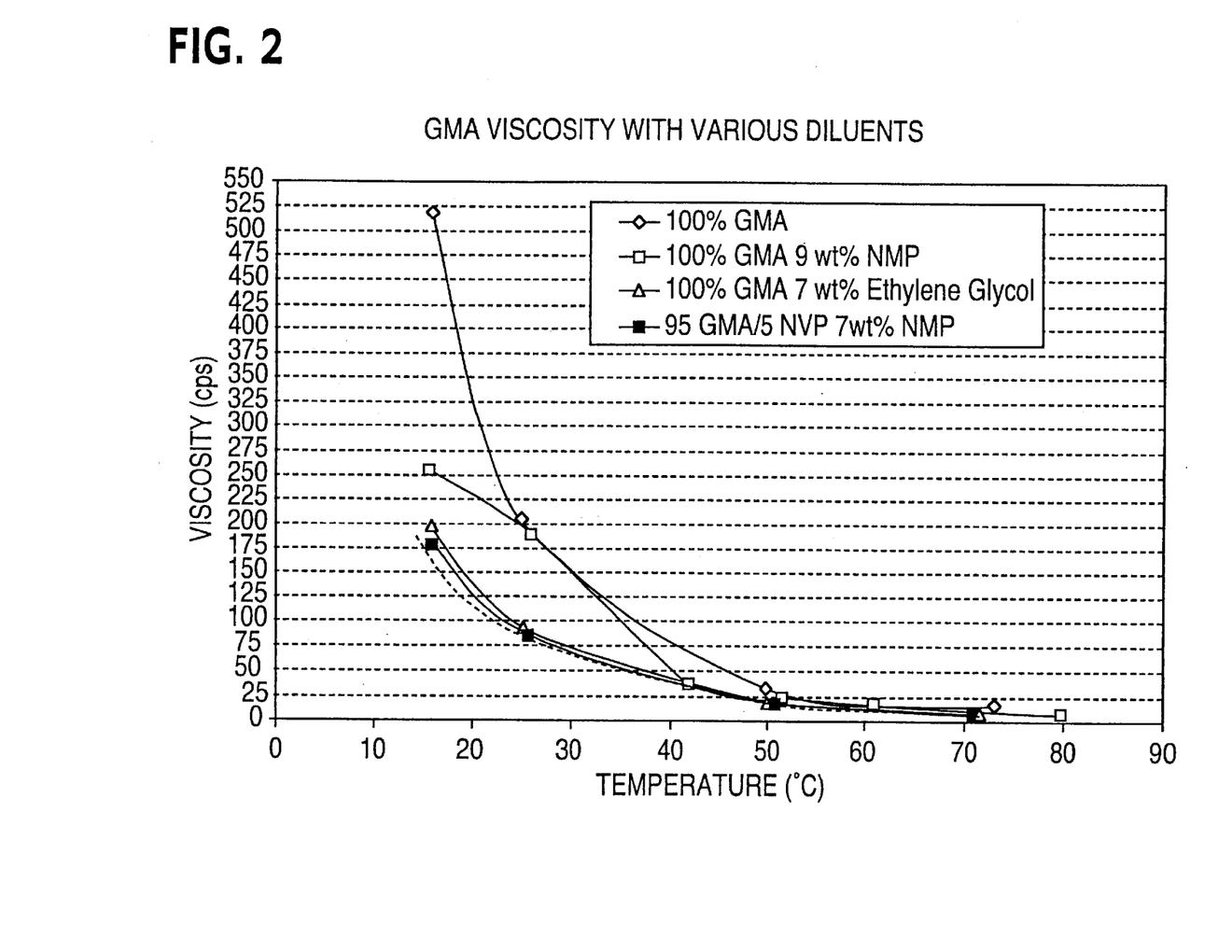
FIG. 2 shows the viscosity of GMA in various diluents.
Figure 3:
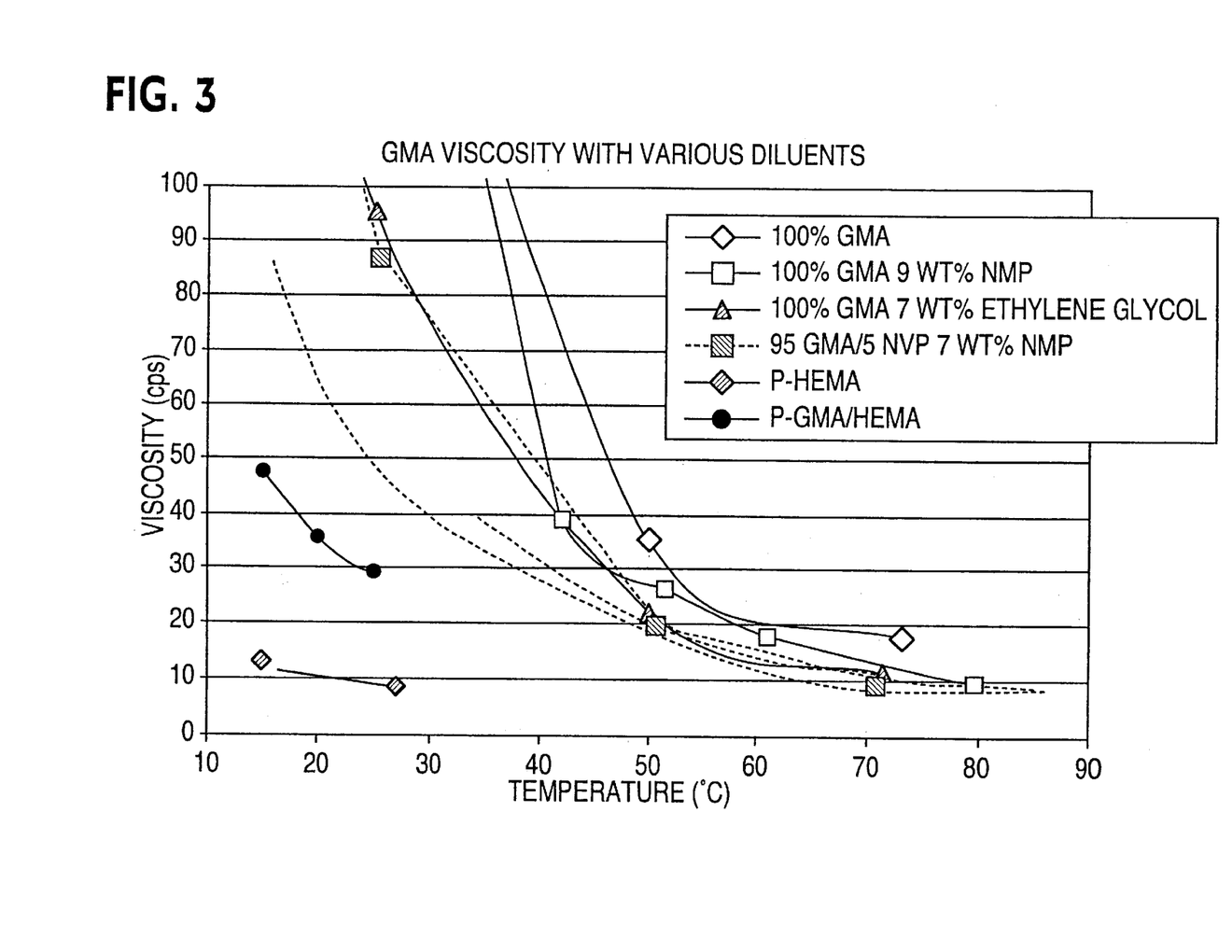
FIG. 3 shows the viscosity of GMA in various diluents.

FIGS. 2 and 3 show the viscosity of GMA with various diluents. Protic diluents are diluents with hydroxyl groups available for H-bonding, and include water, ethylene glycol (EG), and blends thereof. These diluents modify viscosity and affect the GMA hydrogen bond network but can also strongly contribute to the H-bond network. Aprotic diluents are diluents without hydrogen moieties available for H-bonding, such as N-methyl pyrrolidone (NMP), N,N-dimethylformamide (DMF), tetrahydrofuran (THF), and the like. The aprotic diluents are preferably polar. The aprotic diluents can more effectively disrupt the hydrogen bond network while contributing weakly to the network and reducing the viscosity of the GMA monomer. Thus, polar aprotic diluents, such as NMP, are used in the present invention. But again, protic diluents can be combined with the aprotic diluents. In addition to NMP and NVP, any alkyl, or alkenyl N-substituted lactam can be used as polar aprotic diluent.

FIGS. 2 and 3 show the reduction in GMA viscosity, over a range of temperatures, brought about by blending the GMA monomer with both non-reactive diluents, such as NMP and EG, and reactive polar diluents, such as HEMA and NVP. FIGS. 2 and 3 also show that, as expected, differences in the viscosity of the blends decrease with temperature. To approach a viscosity range (<20 cps) like that for HEMA, at room temperature, diluent amounts greater than 15 weight % are generally needed. However, at temperatures above 45° C. the differences in viscosity of the various blends decrease allowing for lower concentration of diluent.

GMA Copolymers & Terpolymers

In addition to GMA homopolymer, the present invention relates to GMA copolymers and terpolymers. The inventors have developed an approach to achieve a high water content in a hydrogel primarily composed of GMA. This approach is to combine the GMA with either a monomer or blend of monomers that also act as a diluent during polymerization to change the intra-intermolecular H-bond network of the GMA monomer and modify the viscosity of the mixture to allow a high degree of cure prior to gel. The copolymer or terpolymers generally have more than about 80 mol percent of GMA, preferably more than 90 mol percent GMA, for example, they are composed of 90 to 99 mole % GMA. The comonomers can be present in amounts of up to 20 mol percent, for example from 0.05 to 20 mol percent, or from 0.5 to 10 mol percent or 1 to 8 mole %.

Any comonomer or mixture of comonomers polymerizable with GMA can be used, so long as the resulting copolymer/terpolymer has physical, optical and machining characteristics suitable for contact lenses. The term copolymers means polymers of at least two monomers, including terpolymers of three monomers, and polymers formed from more than three monomers.

Useful comonomers include pyrrolidone derivative like NVP (N-vinyl pyrrolidone) and alkoxy alkyl methacrylates of the formula $R_1$—O—$R_2$-MA, where $R_1$ is an alkyl group having 1 to 6, preferably 1–4, carbon atoms such as methyl, ethyl, n-propyl, n-butyl and $R_2$ is an alkyl group having 1 to 6, preferably 1–4, carbon atoms such as ethyl and propyl, and MA is methacrylate.

Additions of N-vinyl pyrrolidone (NVP) and alkoxyalkyl-methacrylates like ethoxy ethyl methacrylate (BOEMA) provide improved machinability while maintaining the high water content and water balance values of the copolymers. During polymerization to produce the copolymers, the viscosity of the monomer blends can be further optimized by the inclusion of protic or aprotic diluents such as NMP, EG, or water. During polymerization, a reactive and/or non-reactive aprotic diluent should be used. NMP and NVP modify the viscosity and enhance the mixture reactivity (See Kloosterboer et. al., Phillips Tech. Rev., 40 298 (1982)). The EOEMA also modifies the viscosity of the blend improving reactant mobility.

Contact lens blanks, semi-finished lenses, and contact lenses can be prepared from the GMA homo- and copolymers of the present invention using techniques well know to those in art. See, for example, U.S. Pat. No. 5,532,289, herein incorporated by reference in its entirety.

The contact lenses of the present invention have low protein build-up, a high water balance (low rate of water evaporation and high rate of rehydration) and substantially less tendency to desiccate the cornea of extended wear soft lens patients. Due to the use of a polar aprotic diluent(s) during polymerization, water contents of above 70% or above 72 or 74% can be obtained. UV absorbing monomer (s) and tint-forming pigment(s) can be used in manufacturing the contact lens as would be understood by those in the art. The invention is illustrated by the following examples, which illustrate the invention, but do not limit it.

EXAMPLE 1

Preparation of GMA Homopolymer with 74% Water Content 91.7 grams of GMA were mixed with 8.2 grams of NMP and 0.03 grams of cyclohexanecarbonitrile, 1,1'-azobis initiator. The total diester concentration was adjusted to 0.07% by weight with ethylene glycol dimethacrylate (EGDMA). The mixture was degassed while applying vigorous stirring. The mixture was dispensed into cylindrical molds, polymerized at 50° C. for 10 hours, and post-cured at 100° C. for 5 hours. The polymer was then removed from the molds and formed into contact lens buttons (blanks). The mechanical formation process comprised cutting the polymer into cylinders of 0.5 to 0.65 inches (1.27 to 1.65 cm.) in diameter and 0.1 to 0.2 inches (0.25 to 0.51 cm.) in thickness. The blanks were further cured at 100° C. for 5 hours. After curing, the flat parallel faces of the buttons (blanks) were ground perpendicular to the cylinder walls with the desired dimensions.

EXAMPLE 2

Preparation of GMA/NVP Copolymer with 69% Water Content 91.8 grams of GMA were mixed with 3.4 grams of NVP and 4.8 grams of water. To the mixture, 0.03 grams of 2,2-azobis(2,4-dimethylvaleronitrile) were added and the total diester concentration adjusted to 0.3% by weight with ethylene glycol dimethacrylate (EGDMA). The mixture was degassed while applying vigorous stirring. The mixture was dispensed into cylindrical molds, polymerized at 30° C. for 10 hours, and post-cured at 100° C. for 5 hours. The polymer was then removed from the molds and formed into contact lens blanks. The mechanical formation process included cutting the polymer into cylinders of 0.5 to 0.65 inches (1.27 to 1.65 cm.) in diameter and 0.1 to 0.2 inches (0.25 to 0.51 cm.) in thickness. The blanks were further cured at 100° C. for 5 hours. The polymer was then removed from the molds and formed into contact lens blanks as described previously.

EXAMPLE 3

Preparation of GMA/NVP Copolymer with 74% Water Content 90.1 grams of GMA were mixed with 3.3 grams of NVP and 6.5 grams of NMP. To the mixture 0.03. grams of cyclohexanecarbonitrile, 1,1'-azobis were added. The total diester concentration was adjusted to 0.08% by weight with ethylene glycol dimethacrylate (EGDMA). The mixture was degassed while applying vigorous stirring. The mixture was dispensed into cylindrical molds, polymerized at 50° C. for 10 hours, and post-cured at 100° C. for 5 hours. The polymer was then removed from the molds and formed into contact lens blanks as described in Example 1.

EXAMPLE 4

Preparation of GMA/NVP Copolymer 90.1 grams of GMA were mixed with 3.3 grams of NVP and 6.5 grams of DMF. To the mixture 0.03 grams of cyclohexanecarbonitrile, 1,1'-azobis were added. The total diester concentration was adjusted to 0.07% by weight with ethylene glycol dimethacrylate (EGDMA). The mixture was degassed while applying vigorous stirring. The mixture was dispensed into cylindrical molds, polymerized at 50° C. for 10 hours, and post-cured at 100° C. for 5 hours. The polymer was then removed from the molds and formed into contact lens blanks as described in Example 1.

EXAMPLE 5

Preparation of GMA/NVP Copolymer 90.1 grams of GMA were mixed with 3.3 grams of NVP and 6.5 grams of ethylene glycol. To the mixture 0.03 grams of cyclohexanecarbonitrile, 1,1'-azobis were added. The total diester concentration was adjusted to 0.07% by weight with ethylene glycol dimethacrylate (EGDMA). The mixture was degassed while applying vigorous stirring. The mixture was dispensed into cylindrical molds, polymerized at 50° C. for 10 hours, and post-cure at 100° C. for 5 hours. The polymer was then removed from the molds and formed into contact lens blanks as described in Example 1.

EXAMPLE 6

Preparation of GMA/EOEMA Copolymer with 72% Water Content 89.6 grams of GMA were mixed with 4.6 grams of EOEMA and 5.7 grams of NMP. To the mixture 0.03 grams of cyclohexanecarbonitrile, 1,1'-azobis were added and the total diester concentration adjusted to 0.07% by weight with ethylene glycol dimethacrylate (EGDMA). The mixture was degassed while applying vigorous stirring. The mixture was dispensed into cylindrical molds, polymerized at 50° C. for 10 hours, and post-cured at 100° C. for 5 hours. The polymer was then removed from the molds and formed into contact lens blanks as described in Example 1.

EXAMPLE 7

Preparation of GMA/NVP Copolymer with 74% Water Content 90.1 grams of GMA were mixed with 3.3 grams of NVP and 6.5 grams of NMP. To the mixture, 0.03 grams of cyclohexanecarbonitrile, 1,1'-azobis were added. The total diester concentration was adjusted to 0.07% by weight with ethylene glycol dimethacrylate (EGDMA). The mixture was degassed while applying vigorous stirring. The mixture was dispensed into cylindrical molds, polymerized at 50° C. for 10 hours, and post-cured at 100° C. for 5 hours. The polymer was then removed from the molds and formed into contact lens blanks as described in Example 1.

EXAMPLE 8

Preparation of GMA/NVP/EOEMA Terpolymer with 73% Water Content 87.0 grams of GMA were mixed with 3.3 grams of NVP, 2.0 grams of EOEMA and 6.5 grams of NMP. To the mixture, 0.03 grams of cyclohexanecarbonitrile, 1,1'-azobis were added and the total diester concentration was adjusted to 0.08% by weight with ethylene glycol dimethacrylate (EGDMA). The mixture was degassed while applying vigorous stirring. The mixture was dispensed into cylindrical molds, polymerized at 50° C. for 10 hours, and post-cured at 100° C. for 5 hours. The polymer was then removed from the molds and formed into contact lens blanks as described previously.

The formulations for Examples 1–8 are summarized in Table 1. The properties are set out in Table 2.

TABLE 1

Chemical Composition in Weight Percent

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| 2,3-DHPMA (GMA) | 91.7 | 91.8 | 90.1 | 90.1 | 90.1 | 89.6 | 90.1 | 87 |
| EOEMA | — | — | — | — | — | 4.6 | — | 2 |
| NVP | — | 3.4 | 3.3 | 3.3 | 3.3 | — | 3.3 | 3.3 |
| Initiator VAZO 52/64/88 | 0.03 | 0.03 | 0.03 | 0.03 | 0.03 | 0.03 | 0.03 | 0.03 |
| EGPMA | 0.07 | — | 0.08 | 0.07 | 0.07 | 0.08 | 0.07 | 0.08 |
| NON-REACTIVE DILUENTS | | | | | | | | |
| Protic | — | 4.8 DI-$H_2O$ | — | — | 6.5 EG | — | — | — |
| Aprotic | 8.2 NMP | — | 6.5 NMP | 6.5 DMF | — | 5.7 NMP | 6.5 NMP | 6.5 NMP |

TABLE 2

Material Properties

| PROPERTY | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| Water Content (%) | 74 | 69 | 74 | Not Measured | Not Measured | 72 | 74 | 73 |
| Water Balance (Relative to 2-HEMA) | 15 | 8 | 11 | Not Measured | Not Measured | Not Measured | 8 | 8.5 |
| Linear Expansion | 1.612 | 1.541 | 1.624 | Not Measured | Not Measured | Not Measured | 1.628 | 1.617 |
| Radial Expansion | 1.620 | 1.541 | 1.628 | Not Measured | Not Measured | Not Measured | 1.628 | 1.619 |
| Hardness (Shore D) | 87 | 76 | 87 | 70 | 64 | 85 | 85 | 88 |
| Transmission (%) at 600 nm | >96 | >97 | >98 | Not Measured | Not Measured | Not Measured | >98 | >98 |

Water content and residuals were determined using a gravimetric method that records the wet and dry weights of a number of sample.discs through 2 hydration and drying cycles.
Expansion coefficients (radial and linear) were determined using uniform thickness, approximately 0.1 mm, lenses. Both linear and radial dimensions of the lens are measured in the dry state, followed by lens hydration and repeat of the linear and radial dimension measurements. The coefficients are obtained from the ratios of wet and dry.
Shore D Hardness was obtained using a Shore D durometer (Ser. No. 9075) with a calibrated reference block D34.
% Transmission was measured by placing a hydrated lens in a cuvette that contains saline solution. The cuvette is then place in an UV-visible spectrophotometer and scanned from 700 nm to 250 nm wavelength range. The transmission value at 600 nm is recorded, a subtracted from saline (baseline) and the value reported as % Transmission.

The Water Balance was determined as follows
1. Purpose: The purpose of this test was to determine the water balance capability of the hydrogel lenses using gravimetric techniques. Water balance is defined as the ratio of the time it takes a lens to dehydrate by 10% of its water weight and the time it takes to return to saturation. Values are reported relative to p-HEMA (Polymacon, 38%), used as a control.
   It is important that ambient conditions for the test be maintained accurately, and that all samples be measured under the same controlled conditions. The specified conditions are 21°±2° C. and 40±5% RH.
2. Test Equipment: High precision, calibrated balance (such as Sartorius, Mettler, etc.) with 0.0001 gram capability. The balance should be placed in a controlled temperature and relative humidity environment of 21° C.±2° and 40±5% relative humidity.
3. Fabrication of Sample Lenses: For each material, uniform thickness lenses were based on expansion factors to yield a final wet (uniform) thickness lens of 0.1 mm. Finished dry lenses were cleaned and hydrated overnight in buffered saline solution. BENZ buffered saline solution is composed of 8.01 grams $NaHBO_3$, 2.47 grams of $H_3BO_3$, and 0.14 grams $Na_2B_4O_7:10H_2O$ in 1 liter of distilled water, with a pH=7.26 and an osmolarity of 295 mOs at 22.5° C.
4. Lens Dehydration Procedure. Remove a clean sample lens from saline vial, secure lens on wire holder and blot gently with a lint free paper. Hang the wire holder on a balance scale, weigh and record weight. Dehydrate the lens by 10% of its total water weight, recording the weight and cumulative time every 20 seconds until the 10% weight loss is achieved. After the test is complete, return the lens to the saline flask, allow the lens to rehydrate back to saturation and repeat the drying procedure at least 2 more times to obtain an average weight loss.
5. Lens Rehydration Procedure. Remove a clean sample lens from saline vial, secure lens on wire holder and blot gently with a lint free paper. Hang the wire holder on the balance scale and weigh the lens to determine the weight of the saturated lens. Record the weight. Allow the lens to dehydrate 10% of its water weight (saturated weight×water content×10%). Record weight. Remove wire-holder from the scale and submerge the lens in buffered saline for 10 seconds. Remove the lens from the saline, blot gently with a lint free paper and weigh the lens. Record the weight and time hydrated. After weight is recorded, re-submerge the lens 10 more seconds. Blot and record the weight and cumulative time hydrated. Continue this procedure until the saturated weight of the lens is achieved. Repeat complete procedure 3 times to obtain an average weight gain.

6. Results: The water balance ratio of a material is obtained by dividing the time (in minutes) to dehydrate 10% from saturation by the time (in minutes) to rehydrate from 90% of saturation. This ratio value is the compared to p-HEMA control.

With the exception of Example 2 (69%), all examples show a water content higher than 70% and relative water balance values higher than p-GMA/2-HEMA (69% water described in U.S. Pat. No. 5,532,289).

The contact lenses of the present invention have unexpectedly high water balance, i.e., of greater than about 8. This high water balance was quite unexpected and found by the present inventors only after fabrication of contact lenses from the described GMA materials. Contact lenses formed from the materials of the invention offer numerous improvements, including: high water balance, high water content, reduction of opacity in the lenses, ease of lenses machining, and increased material strength.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of forming a contact lens, comprising:
    (a) polymerizing a mixture of monomers to produce a polymer comprising more than about 80 mole percent of incorporated 2,3-dihydroxypropyl methacrylate and from about 0.05 to about 20 mole percent of incorporated alkoxyalkyl methacrylate having the formula wherein $R_1$ and $R_2$ are independently selected from the group of alkyl groups having 1 to 6 carbon atoms, and MA is methacrylate; and
    (b) forming the polymer into the contact lens.

2. The method of forming a contact lens according to claim 1, wherein the mixture of monomers is polymerized in the presence of a polar aprotic diluent.

3. The method of forming a contact lens according to claim 2, wherein the polar aprotic diluent is selected from the group consisting of tetrahydrofuran, N,N-dimethylformamide, N-alkyl lactams, and combinations thereof.

4. The method of forming a contact lens according to claim 2, wherein the polar aprotic diluent comprises N-methyl pyrrolidone.

5. The method of forming a contact lens according to claim 2, wherein the mixture of monomers is polymerized in the presence of a polar protic diluent.

6. The method of forming a contact lens according to claim 1, wherein the polar protic diluent comprises water.

7. The method of forming a contact lens according to claim 1, wherein the polymer further comprises an incorporated crosslinking agent.

8. The method of forming a contact lens according to claim 7, wherein the crosslinking agent is ethylene glycol dimethacrylate.

9. A method of forming a contact lens, comprising:
    (a) polymerizing a mixture of monomers to produce a polymer comprising more than about 80 mole percent of incorporated 2,3-dihydroxypropyl methacrylate and from about 0.05 to about 20 mole percent of an incorporated N-alkenyl pyrrolidone and an incorporated alkoxyalkyl methacrylate having the formula wherein $R_1$ and $R_2$ are independently selected from the group of alkyl groups having 1 to 6 carbon atoms, and MA is methacrylate; and
    (b) forming the polymer into the contact lens.

10. The method of forming a contact lens according to claim 9, wherein the mixture of monomers is polymerized in the presence of a non-reactive polar aprotic diluent.

11. The method of forming a contact lens according to claim 10, wherein the non-reactive polar aprotic diluent is selected from the group consisting of tetrahydrofuran, N, N-dimethylformamide, N-alkyl lactams, and combinations thereof.

12. The method of forming a contact lens according to claim 10, wherein the non-reactive polar aprotic diluent comprises N-methyl pyrrolidone.

13. The method of forming a contact lens according to claim 10, wherein the mixture of monomers is polymerized in the presence of a polar protic diluent.

14. The method of forming a contact lens according to claim 13, wherein the polar protic diluent comprises water.

15. The method of forming a contact lens according to claim 13, wherein the polymer further comprises an incorporated crosslinking agent.

16. The method of forming a contact lens according to claim 15, wherein the crosslinking agent is ethylene glycol dimethacrylate.

17. A method of forming a contact lens, comprising:
    (a) polymerizing a mixture of monomers in the presence of a non-reactive polar aprotic diluent to produce a polymer comprising an incorporated crosslinking agent and greater than about 99 mole percent of incorporated 2,3-dihydroxypropyl methacrylate; and
    (b) forming the polymer into the contact lens.

18. The method of forming a contact lens according to claim 17, wherein the non-reactive polar aprotic diluent is selected from the group consisting of tetrahydrofuran, N, N-dimethylformamide, N-alkyl lactams, and combinations thereof.

19. The method of forming a contact lens according to claim 17, wherein the non-reactive polar aprotic diluent comprises N-methyl pyrrolidone.

20. The method of forming a contact lens according to claim 17, wherein the mixture of monomers is polymerized in the presence of a polar protic diluent.

21. The method of forming a contact lens according to claim 20, wherein the polar protic diluent comprises water.

22. The method of forming a contact lens according to claim 17, wherein the mixture of monomers is polymerized in the presence of a radical initiator.

23. The method of forming a contact lens according to claim 22, wherein the radical initiator is 1,1'-azobis(cyclohexanecarbonitrile).

24. The method of forming a contact lens according to claim 17, wherein the crosslinking agent is ethylene glycol dimethacrylate.

* * * * *